(12) United States Patent
Moyer

(10) Patent No.: US 8,180,969 B2
(45) Date of Patent: May 15, 2012

(54) CACHE USING PSEUDO LEAST RECENTLY USED (PLRU) CACHE REPLACEMENT WITH LOCKING

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 269 days.

(21) Appl. No.: 12/014,594

(22) Filed: Jan. 15, 2008

(65) Prior Publication Data

US 2009/0182952 A1 Jul. 16, 2009

(51) Int. Cl.
*G06F 12/00* (2006.01)
*G06F 13/00* (2006.01)
*G06F 13/28* (2006.01)

(52) U.S. Cl. ........ 711/136; 711/133; 711/134; 711/135; 711/145

(58) Field of Classification Search ................... 711/136, 711/170–173
See application file for complete search history.

(56) References Cited

U.S. PATENT DOCUMENTS

| 5,353,425 | A | | 10/1994 | Malamy et al. | |
|---|---|---|---|---|---|
| 5,930,829 | A | * | 7/1999 | Little | 711/170 |
| 5,956,744 | A | * | 9/1999 | Robertson et al. | 711/122 |
| 5,974,508 | A | * | 10/1999 | Maheshwari | 711/133 |
| 6,047,358 | A | * | 4/2000 | Jacobs | 711/133 |
| 7,039,760 | B2 | * | 5/2006 | Arimilli et al. | 711/118 |
| 7,363,433 | B2 | * | 4/2008 | Bell et al. | 711/145 |
| 2005/0055506 | A1 | * | 3/2005 | DeMent et al. | 711/133 |
| 2006/0230228 | A1 | | 10/2006 | Samaan et al. | |
| 2007/0043906 | A1 | * | 2/2007 | Hall et al. | 711/136 |
| 2007/0186046 | A1 | * | 8/2007 | Irish et al. | 711/133 |

OTHER PUBLICATIONS

U.S. Appl. No. 11/929,180, filed Oct. 30, 2007.

* cited by examiner

*Primary Examiner* — Yaima Campos
(74) *Attorney, Agent, or Firm* — Joanna G. Chiu; Robert L. King

(57) ABSTRACT

A cache stores information in each of a plurality of cache lines. Addressing circuitry receives memory addresses for comparison with multiple ways of stored addresses to determine a hit condition representing a match of a stored address and a received address. A pseudo least recently used (PLRU) tree circuit stores one or more states of a PLRU tree and implements a tree having a plurality of levels beginning with a root and indicates one of a plurality of ways in the cache. Each level has one or more nodes. Multiple nodes within a same level are child nodes to a parent node of an immediately higher level. PLRU update circuitry that is coupled to the addressing circuitry and the PLRU tree circuit receives lock information to lock one or more lines of the cache and prevent a PLRU tree state from selecting a locked line.

18 Claims, 12 Drawing Sheets

| IF THE CURRENT ACCESS IS TO: | THEN THE PLRU BITS ARE CHANGED TO: | | | | | | |
|---|---|---|---|---|---|---|---|
| | NODE 200 | NODE 201 | NODE 202 | NODE 203 | NODE 204 | NODE 205 | NODE 206 |
| WAY 0 | 1 | 1 | X | 1 | X | X | X |
| WAY 1 | 1 | 1 | X | 0 | X | X | X |
| WAY 2 | 1 | 0 | X | X | 1 | X | X |
| WAY 3 | 1 | 0 | X | X | 0 | X | X |
| WAY 4 | 0 | X | 1 | X | X | 1 | X |
| WAY 5 | 0 | X | 1 | X | X | 0 | X |
| WAY 6 | 0 | X | 0 | X | X | X | 1 |
| WAY 7 | 0 | X | 0 | X | X | X | 0 |

LEVEL 0 — LEVEL 1 — LEVEL 2

*FIG. 3* —PRIOR ART—

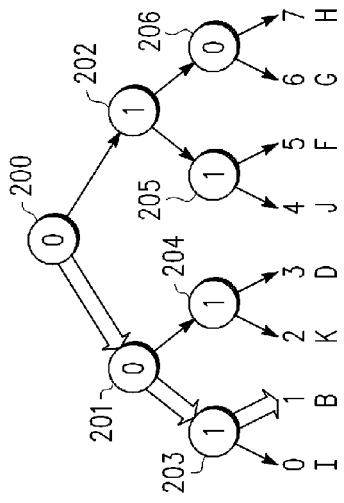
FIG. 4 -PRIOR ART-
ACCESS ADDRESS I, ALLOCATE WAY 0
FIG. 5 -PRIOR ART-
ACCESS ADDRESS J, ALLOCATE WAY 4
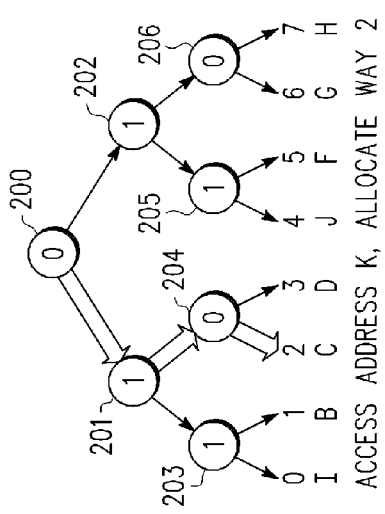
FIG. 6 -PRIOR ART-
ACCESS ADDRESS K, ALLOCATE WAY 2
FIG. 7 -PRIOR ART-
ACCESS ADDRESS J, HIT WAY 4
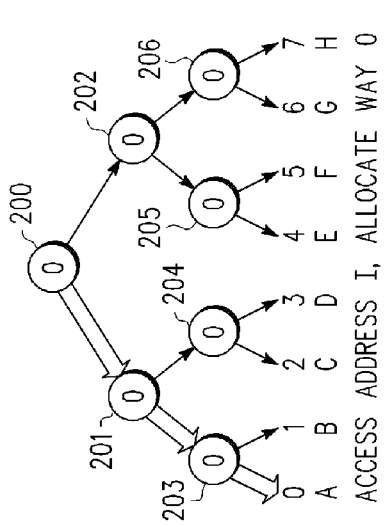
FIG. 8 -PRIOR ART-

| CURRENT ACCESS | B0 | B1 | B2 | B3 | B4 | B5 | B6 |
|---|---|---|---|---|---|---|---|
| W0 | ~lk_B2 | ~lk_B4 | NO UPDATE | ~lk_W1 | NO UPDATE | NO UPDATE | NO UPDATE |
| W1 | ~lk_B2 | ~lk_B4 | NO UPDATE | lk_W0 | NO UPDATE | NO UPDATE | NO UPDATE |
| W2 | ~lk_B2 | lk_B3 | NO UPDATE | NO UPDATE | ~lk_W3 | NO UPDATE | NO UPDATE |
| W3 | ~lk_B2 | lk_B3 | NO UPDATE | NO UPDATE | lk_W2 | NO UPDATE | NO UPDATE |
| W4 | lk_B1 | NO UPDATE | ~lk_B6 | NO UPDATE | NO UPDATE | ~lk_W5 | NO UPDATE |
| W5 | lk_B1 | NO UPDATE | ~lk_B6 | NO UPDATE | NO UPDATE | lk_W4 | NO UPDATE |
| W6 | lk_B1 | NO UPDATE | lk_B5 | NO UPDATE | NO UPDATE | NO UPDATE | ~lk_W7 |
| W7 | lk_B1 | NO UPDATE | lk_B5 | NO UPDATE | NO UPDATE | NO UPDATE | lk_W6 |

LEVEL 0 — LEVEL 1 — LEVEL 2

(NOTE: lk_Wx → WAY x LOCK BIT SET; lk_Bx → BOTH NODES BELOW Bx ARE LOCKED)

FIG. 12

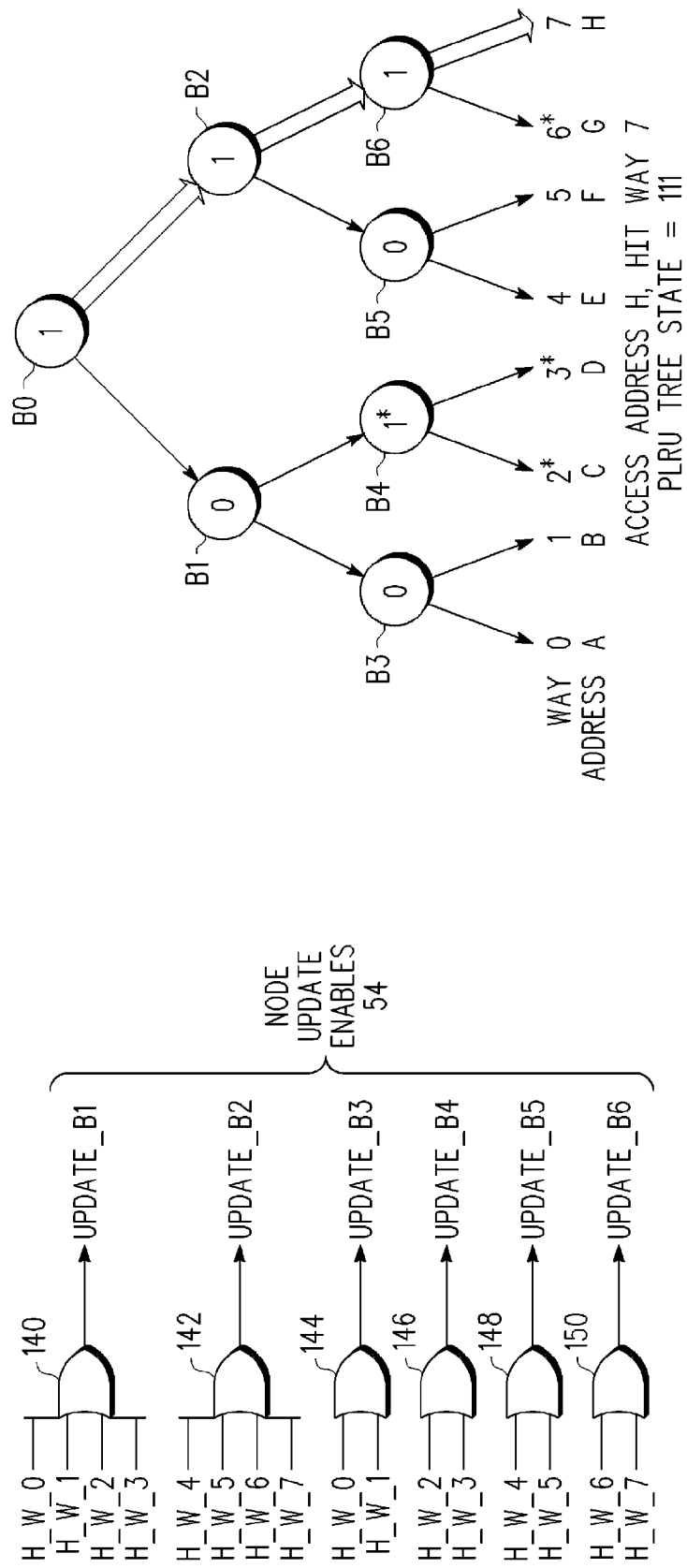

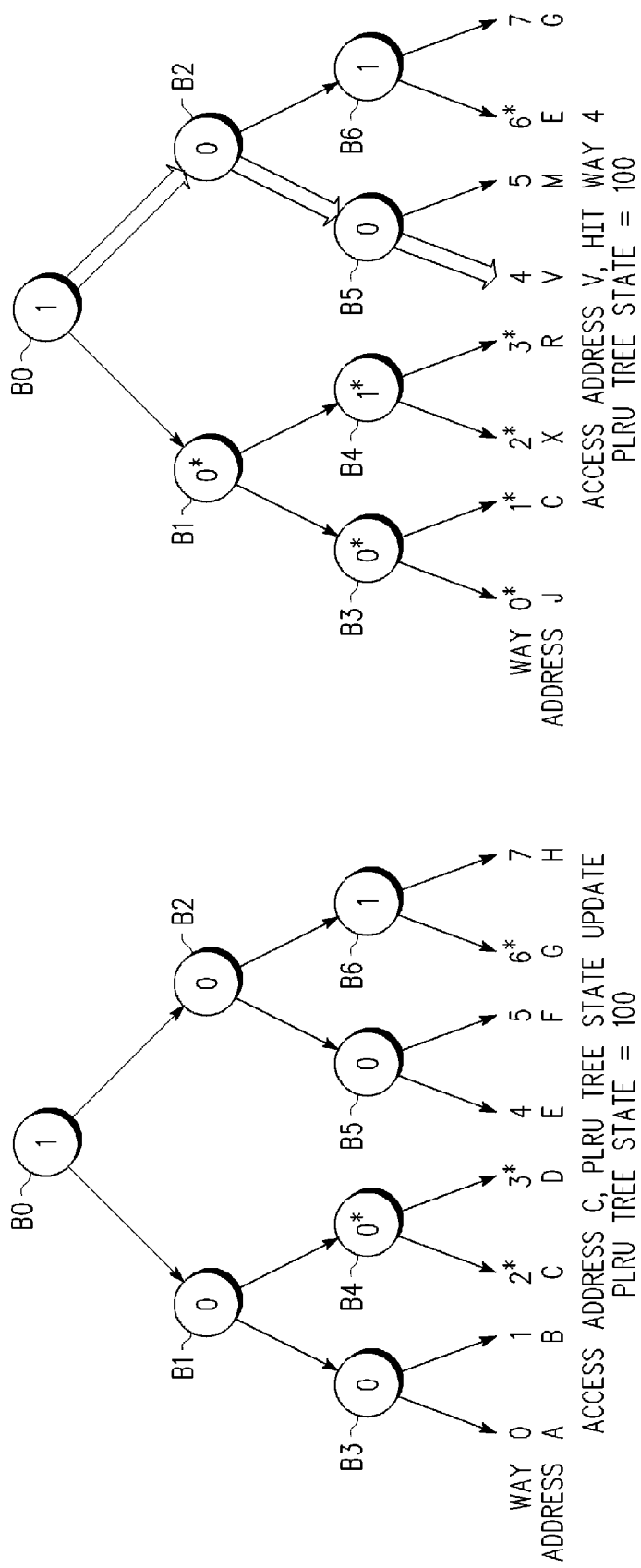

CACHE USING PSEUDO LEAST RECENTLY USED (PLRU) CACHE REPLACEMENT WITH LOCKING

BACKGROUND

1. Field

This disclosure relates generally to caches, and more specifically, to pseudo least recently used cache replacement.

2. Related Art

Typically, cache structures may incorporate the ability to lock portions of the cache such that they become unavailable for replacement. In these cache structures, after generating the replacement pointer on a cache miss, the replacement pointer is compared with the lock information in order to generate a modified replacement pointer. However, the ability to generate the modified replacement pointer takes additional gate delays and typically appears in a speed path of the design, negatively impacting the design. Furthermore, the modified replacement pointer may reflect a replacement choice that is far less optimal, thus further reducing cache performance.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 illustrates, in tabular form, PLRU bit update rules in accordance with the prior art.

FIGS. 4-8 illustrate, in state diagram form, a PLRU replacement method for one set of an 8-way set associative cache using a binary tree having 7 nodes in accordance with the prior art.

FIG. 12 illustrates, in tabular form, PLRU bit update rules with integrated lock information in accordance with one embodiment of the present invention.

FIGS. 13 and 14 illustrate, in schematic form, a portion of the PLRU update logic of FIG. 2 used to implement the PLRU bit update rules of FIG. 12 in accordance with one embodiment of the present invention.

FIGS. 15-20 illustrate, in state diagram form, a PLRU replacement method for one set of an 8-way set associative cache using a binary tree having 7 nodes in accordance with one embodiment of the present invention.

DETAILED DESCRIPTION

Figure 1:
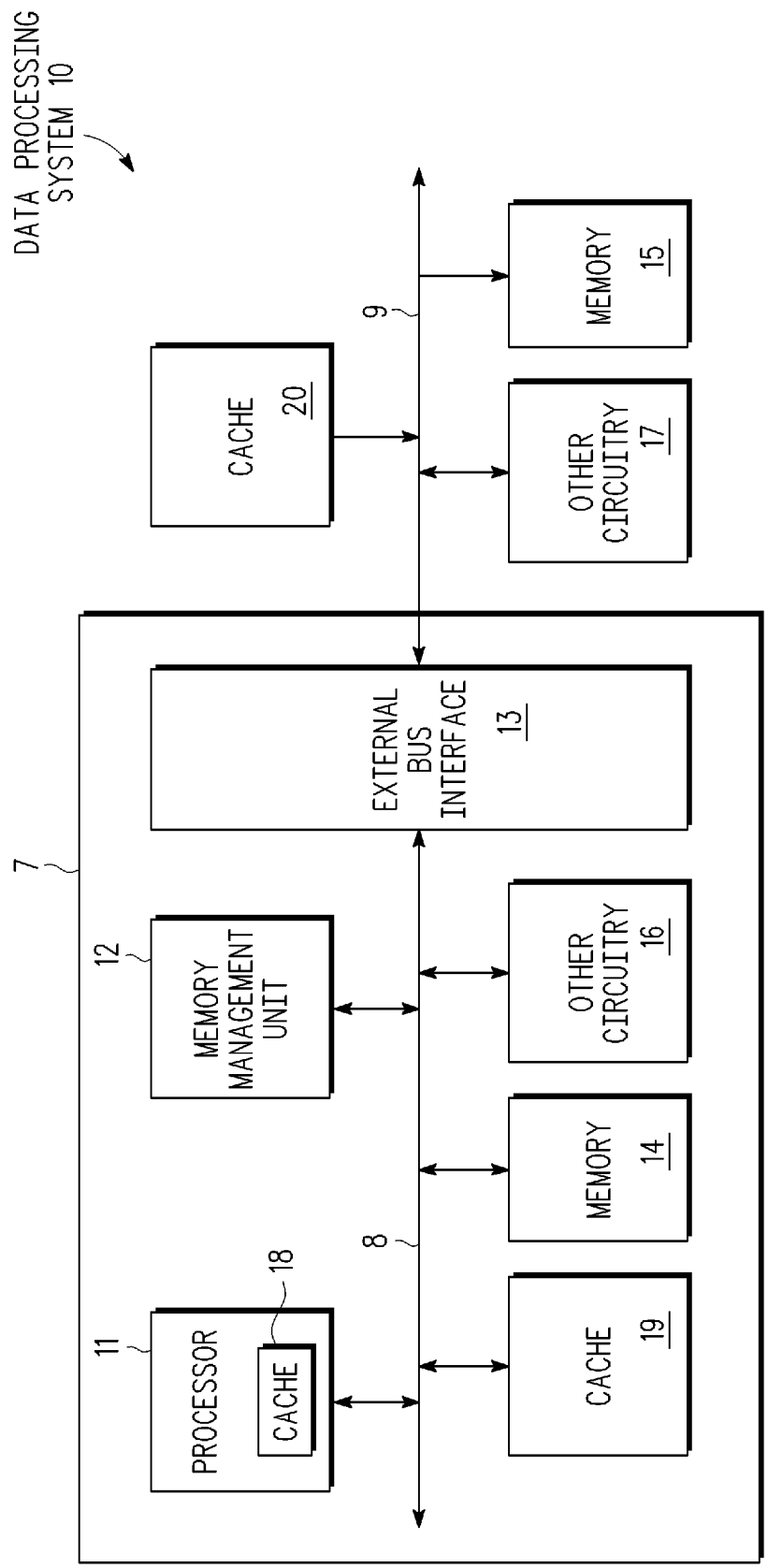
FIG. 1 illustrates, in block diagram form, a data processing system in accordance with one embodiment of the present invention.

A new replacement methodology and its associated circuitry has been developed which allows for the merging of locking control information into the replacement logic directly (e.g., into the PLRU tree logic directly). By merging the locking information directly into the PLRU tree nodes, overhead cycles may be minimized, resulting in improved speed. When a way or line of a cache is replaced, currently known PLRU tree update methods update the nodes of the tree to typically mark an entry as "most recently used", and the state of the nodes from the bottom of the tree back up to the root of the tree are set to point "away" from the replaced way. Therefore, on a subsequent lookup and hit, the state of the nodes along the path from the hitting entry back to the root of the tree are also updated to point away from the now "most recently used" way by clearing them to 0 or setting them to 1 depending on the node position. Note that this prior art updating of the PLRU tree nodes is done without taking into account lock information for the cache. Therefore, post-processing of the selected replacement way must be performed to determine if the selected way is actually available for replacement (i.e. not locked) and further post-processing must be performed if in fact the selected way is locked because another replacement way must then be chosen. This occurs because prior art PLRU tree nodes are not prevented from pointing to locked ways or lines, since lock information is not taken into account with respect to the PLRU tree.

However, one embodiment of the present invention allows for the locking information to be merged into the nodes of the tree such that the leaf node of a locked way or line is frozen in the state to point away from the locked way or line. In addition, in one embodiment of the present invention, this node status information is sent to the parent node, and if both child nodes of a parent node are frozen, then the parent node of that parent node whose child nodes are both frozen is also frozen to point away from that parent node. This status information is therefore propagated up the tree. If the root node of the tree is frozen, then all entries or ways of the cache are locked. By integrating the lock information within the PLRU replacement tree and by propagating this information upwards, a standard traversal of the PLRU tree can be performed to find the next victim way or line to be replaced. In this manner, unlike prior art methods, no additional post-processing of the selected way is needed to take into consideration the locking status of the selected way or to find a suitable replacement way when the selected way is in fact determined to be locked.

As used herein in, a binary tree includes a plurality of nodes, each located within a level of the tree. The top node is referred to as the root node and has one or two child nodes, but no parent node. A child node, with respect to a parent node, is the node that is immediately below a parent node, where a parent node, with respect to a child node, is the node that is immediately above the child node. In a binary tree, each parent node can have 0, 1, or 2 child nodes, and each child node has only one parent node. Furthermore, leaf nodes refer to nodes with no child nodes. Also, each node is located in a particular level of a tree, where each level includes nodes that are a same distance down from the root node. These terms will be better understood below with respect to descriptions of the FIGS.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Brackets are used herein to indicate the conductors of a bus or a plurality of signals or the bit locations of a value. For example, "bus 50 [7:0]", "bus [7:0] 50, "conductors [7:0] of bus 60", or other permutations thereof, indicates the eight lower order conductors of bus 60; "HIT_WAY [0:7] 50 signals", "HIT_WAY [0:7 ] signals 50", "HIT_WAY [0:7] conductors 50", or other permutations thereof, indicates the eight lower order signals of a plurality of signals 50; and "address bits [7:0]", "ADDRESS [7:0]", or other permutations thereof, indicates the eight lower order bits of an address value.

FIG. 1 illustrates, in block diagram form, a data processing system 10 in accordance with one embodiment of the present invention. In the illustrated embodiment, data processing system 10 has an integrated circuit 7. The integrated circuit has a processor 11, a memory management unit 12, a cache 19, a memory 14, other circuitry 16, and an external bus interface 13 that are all bi-directionally coupled by way of bus 8. Integrated circuit 7 and the circuitry therein is also bi-directionally coupled to an external bus 9 by way of external bus interface 13. In the illustrated embodiment, cache 20, memory 15, and other circuitry are bi-directionally coupled to external bus 9. External bus 9 is called an "external" bus because it goes external to integrated circuit 7. In the illustrated embodiment, processor 11 has a cache 18. In an alternate embodiment, one or more of caches 18, 19, and 20 may be located anywhere within data processing system 10. Alternate embodiments may have only cache 18, only cache 19, only cache 20, or any combination of caches 18-20. In addition, alternate embodiments may have one or more caches represented by each of caches 18-20. For example, cache 18 may represent a data cache and an instruction cache. Caches 18-20 may be any type of cache, and may be the same type of cache, or different types of caches. Other circuitry 16 and other circuitry 17 may be any type of circuitry.

Alternate embodiments of data processing system 10 may have any circuitry that includes one or more caches (e.g. caches 18-20). Aside from the one or more caches (e.g. caches 18-20), the remaining circuitry illustrated in FIG. 1 may or may not be included in alternate embodiments of system 10. In addition, alternate embodiments of system 10 may include additional circuitry which is not illustrated in FIG. 1. Also, in alternate embodiments, any one or more portions of system 10 may be integrated on a same integrated circuit.

Figure 2:
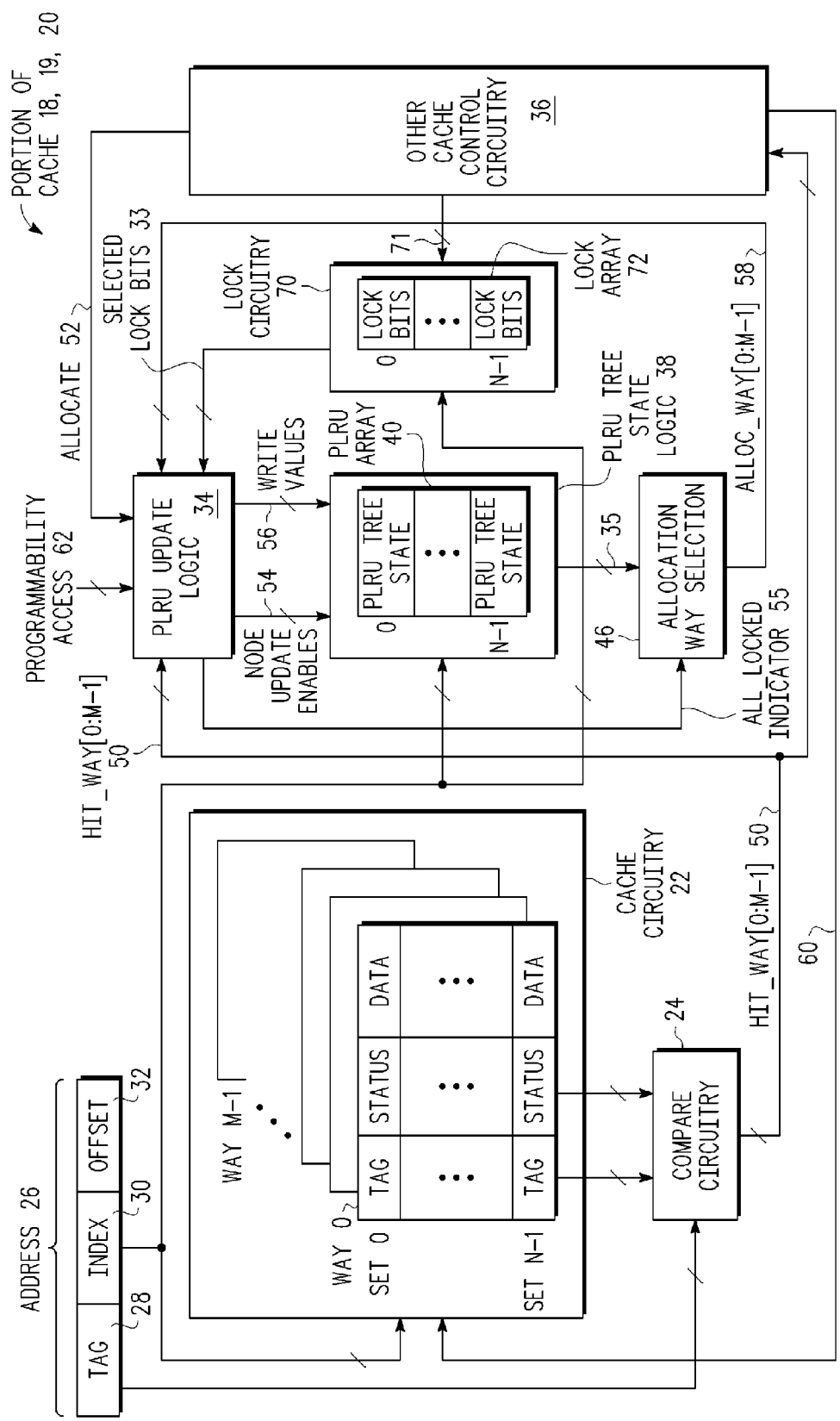
FIG. 2 illustrates, in block diagram form, a portion of a cache of FIG. 1 in accordance with one embodiment of the present invention.

FIG. 2 illustrates a portion of any one or more of caches 18-20 of FIG. 1 in accordance with one embodiment. Alternate embodiments of caches 18-20 may use a different structure than that illustrated in FIG. 2, and may use different structures than each other. The cache 18-20 illustrated in FIG. 2 has "N" sets and "M" ways, and may be referred to as multi-way caches or as multi-way set-associative caches. The one or more caches in alternate embodiments may each have any number of sets and any number of ways. Note that, as used herein, a cache line refers to an intersection of a cache way and a set. For example, way 0 includes N cache lines, each corresponding to one of set 0 to set N−1. Therefore, when a way is replaced, the information in one or more cache lines (which is selected by index 30, as will be described below) is actually replaced. That is, the entire way may not be replaced, but only one or more particular lines or entries.

In the illustrated embodiment, cache circuitry 22 is storage circuitry which stores information in each of a plurality of cache lines or entries. For example, cache circuitry 22 includes tag, status, and data information for the cache lines or entries. Address 26 includes tag 28, index 30, and offset 32. Index 30 is provided to cache circuitry 22 which indicates a particular cache line or entry (i.e. one of set 0 to set N−1). Compare circuitry 24 is coupled to receive tag 28 and is coupled to cache circuitry 22 to receive tag and status information. Based on this received information, compare circuitry 24 determines whether there has been a cache hit or a cache miss. In the illustrated embodiment, a plurality of hit/miss signals labeled HIT_WAY[0:M−1] 50 are provided to PLRU update logic 34 and to other cache control circuitry 36. Each HIT_WAY[0:M−1] 50 signal indicates whether or not there has been a cache hit for its corresponding way in cache circuitry 22. Alternate embodiments may use a cache miss signal in addition to or instead of a cache hit signal.

Other cache control circuitry 36 is coupled to PLRU update logic 34 to provide an allocate signal 52, and other cache control circuitry 36 is coupled to cache circuitry 22 by way of conductors or signals 60. Cache control circuitry 36 is also coupled to lock circuitry 70 by way of conductors or signals 71. In alternate embodiments, other cache control circuitry 36 and PLRU control circuitry 34 may be bi-directionally coupled by other signals (not shown). In alternate embodiments, other cache control circuitry 36 may be coupled to all portions of cache 18-20 that receive cache control signals or that provide information that is needed in order to perform cache control. For example, in some embodiments, cache control circuitry 36 may be coupled to all of the circuit blocks illustrated in FIG. 2.

In the illustrated embodiment, PLRU update logic 34 receives an ALLOC_WAY[0:M−1] 58 signal for each of the M ways of cache 18-20. PLRU control circuitry 34 also receives programmable access control signals 62 and receives selected lock bits 33 from lock circuitry 70. PLRU update logic 34 is coupled to PLRU tree state logic 38 to provide a plurality of node update enable signals 54 and a plurality of write values 56. (PLRU update logic 34 may also be referred to as PLRU update circuitry.) PLRU tree state logic 38 receives index 30 and has a PLRU array 40. PLRU array 40 stores N PLRU tree states, where each PLRU tree state represents node values, or an encoding of node values, for a corresponding PLRU tree. PLRU tree state logic 38 is coupled to allocation way selection circuitry 46 by way of conductors or signals 35. PLRU update logic 34 also provides an all_locked indicator 55 to allocation way selection circuitry 46. Note that elements 33, 35, 50, 52, 54, 55, 56, 60, 62, and 71 and any arrows without a reference number in FIG. 2 may be considered to be one or more signals or one or more conductors in alternate embodiments, regardless of whether a hash line is used in FIG. 2.

In the illustrated embodiment, lock circuitry 70 receives index 30 from address 26 and has a lock array 72. Lock array 72 stores N entries of lock bits, where an entry of lock array 72 is selected by index 30. Each entry of lock bits in lock array 72 provides lock information for each way within a corresponding set of sets 0 to N−1. That is, each entry of lock bits in lock array 72 provides lock information for a particular cache line in each of ways 0 to M−1. For example, the first entry of lock bits in lock array 72 may includes M bits, one for each of the M ways of cache circuitry 22, indicating whether, for set 0, each of the ways is locked or unlocked, where, for example, an asserted bit can indicate locked and an unasserted bit can indicate unlocked. Note that in alternate embodiments, a single set of global lock bits can be used for all sets of cache circuitry 22, such that each lock bit of these global lock bits indicates whether or not a way is locked, across all sets. In this embodiment, index 30 may not be provided to lock circuitry 70. Also, note that lock circuitry 70 may be located anywhere within caches 18-20. For example, in one embodiment, they may be stored alongside PLRU array 40. Alternatively, they may be stored as part of the PLRU tree state itself.

Although one type of architecture for caches 18-20 has been illustrated in FIG. 2, alternate embodiments of caches 18-20 may use any desired or appropriate architecture. The architecture illustrated in FIG. 2 is merely intended to be one possible representative architecture. Any cache architecture that allows for the desired cache replacement may be used. Note that for one embodiment, the cache 18-20 illustrated in FIG. 2 may function in a same or similar manner as prior art caches, with the exception of how cache 18-20 handles cache replacement. In alternate embodiments, cache 18-20 may also function differently than prior art caches in other manners aside from cache replacement.

In operation, FIG. 2 illustrates a portion of any one or more of caches 18, 19, and/or 20 of FIG. 1. Address 26 has a tag portion 28, an index portion 30, and an offset portion 32. The index portion 30 is used to select a set in cache circuitry 22 (and is used to select a corresponding PLRU tree state in PLRU array 40 and corresponding lock bits in lock array 72). The tag information from cache circuitry 22 is compared to tag 28 and qualified by status information (e.g. valid bits) from cache circuitry 22. The result of the compare and qualification (e.g. match and valid) determines whether or not a cache hit occurs. As described above, each HIT_WAY[0:M–1] 50 signal indicates whether or not there has been a cache hit for its corresponding way in cache circuitry 22. This portion of cache 18, 19 and/or 20 may operate in a standard prior art manner.

The cache illustrated in FIG. 2 has "N" sets and "M" ways. Each set has a corresponding PLRU tree state in PLRU array 40. PLRU array 40 is used to store the existing PLRU tree states for all N sets. The existing PLRU tree states are traversed using allocation way selection circuitry 46 to select the way that will be allocated for a new cache entry (provided via ALLOC_WAY[0:M–1] signals 58). PLRU update logic 34 controls the updating of the PLRU tree states in PLRU array 40 by providing node update enables 54 (to indicate which nodes, if any, are to be updated) and write values 56 (to indicate the new values of the nodes, if any, that are to be updated). (As used herein, the current PLRU tree state that is to be updated refers to the PLRU tree state selected by index 30, which corresponds to the current set being accessed.) PLRU tree state logic 38 uses node update enables 54 and write values 56 to properly update the PLRU tree states in PLRU array 40. In the illustrated embodiment, each set also has a corresponding set of lock bits in lock array 72. Lock circuitry 70 provides the selected lock bits 33 from lock array 72 (selected based on index 30). As will be described in further detail below, PLRU update logic 34 uses selected lock bits 33 (which indicates which ways, if any, of the current set being accessed are locked) to update the PLRU tree states in PLRU array 40. In this manner, the way selected for allocation of a new cache line or entry by allocation way selection circuitry 46 using a current PLRU tree state of PLRU array 40 is known to be an unlocked way (i.e. an unlocked line within the selected way), assuming that all_locked indicator 55 does not indicate that all ways are locked. Therefore, no subsequent lock merging logic is required to determine whether the way selected by allocation way selection circuitry 46 is available for replacement (i.e. whether the way or the line indicated by index 30 within the selected way is unlocked) and to then identify a replacement way if the way selected by allocation way selection circuitry 46 turns out to be locked.

In the illustrated embodiment, other cache control circuitry 36 provides an allocate signal 52 to PLRU update logic 34. This allocate signal 52 indicates whether or not to allocate when a cache miss has occurred. Other cache control circuitry 36 also provides control signals 60 to cache circuitry 22 (e.g. for read/write control). For example, other cache control circuitry 36 may, under control of processor 11, update the lock information stored in lock array 72 via conductors 71. For example, processor 11 may execute special cache instructions to update the lock information in lock array 72. Also, in one embodiment, aspects of PLRU control logic 34 may be programmable by, for example, a user of system 10, via programmability access 62.

Although FIG. 2 illustrates specific circuitry than may be used to implement a portion of cache 18, 19, and/or 20 of FIG. 1, alternate embodiments may use any desired circuitry that allows PLRU update logic 34 to use lock information when updating PLRU tree states of PLRU array 40. A wide variety of circuit implementations may be used. The circuitry illustrated in FIG. 2 is merely intended to illustrate one possible embodiment.

FIG. 3 illustrates, in tabular form, PLRU bit update rules in accordance with the prior art. That is, the table of FIG. 3 provides PLRU bit update rules in which lock information is not merged into the PLRU tree state updates. The table of FIG. 3 is applicable to an 8 way set associative cache, in which the PLRU tree is implemented as a binary tree having 7 nodes. For a cache hit, hit signals (such as, e.g. HIT_WAY [0:7] 50 signals) are used to select which row in FIG. 3 (i.e. which way) is to be used. For cache allocation, allocation select signals (such as, e.g., ALLOC_WAY[0:7] 58 signals) are used to select which row in FIG. 3 (i.e. which way) is to be used. A "1" or a "0" in a row in FIG. 3 indicates that the corresponding node update enable signal of that node is asserted, and the corresponding write value of that node is a "1" or a "0", respectively. An "X" in a row in FIG. 3 indicates that the corresponding node update enable signal is negated, and the corresponding write value is a don't care since no write will take place. However, note that the table of FIG. 3 does not take into consideration any lock information for any of WAY0-7. That is, the node updates are performed according to the information of table 3 without regards to whether any of ways 0-7 are locked.

FIGS. 4-8 illustrate a prior art PLRU replacement method for one set of an 8-way set associative cache using a binary tree having 7 nodes labeled 200-206, where the nodes are updated according to the table of FIG. 3. Note that FIG. 4 assumes that ways 0-7 of the cache are storing addresses A-H, respectively, and that the value of all nodes is "0". In the illustrated embodiment, the thick arrows indicate the next way for allocation. Note also that for the illustrated embodiment, the binary tree is only traversed on allocation. For alternate embodiments, the binary tree may be traversed on cache hits, cache misses, or any other desired and appropriate occurrence or combination of occurrences. Of course the path of traversal of the tree will vary accordingly. The binary tree of FIG. 4 is traversed when a miss occurs in the cache and it has been determined that allocation is desired. The binary tree of FIG. 4 is traversed in the following manner: a "0" in a node means "go left", and a "1" in a node means "go right". So for example, referring to FIG. 4, when an access to address 1 (a miss) is received, traversal of the binary tree starts at node 200. Because node 200 has a value "0", the traversal goes left to node 201. Because node 201 has a value "0", the traversal goes left to node 203. Because node 203 has a value "0", the traversal goes left to way 0. Since way 0 has been selected, address 1 replaces address A in way 0 of the cache. Therefore, note that the current tree state that was used to select way 0 can be encoded as "000," in which each of the bit values corresponds to the value of the node that was traversed to reach way 0 (e.g., nodes 200, 201, and 203, respectively). The prior art PLRU replacement method requires that all of the nodes in the path to the selected way (i.e. way 0) are changed to point away from the way that was just selected (i.e. way 0). Referring to FIG. 5, this method results in nodes 200, 201, and 203 having their respective states changed to a "1".

Referring to FIG. 5, when an access to address J (a miss) is received, traversal of the binary tree starts at node 200. Because node 200 has a value "1", the traversal goes right to node 202. Because node 202 has a value "0", the traversal goes left to node 205. Because node 205 has a value "0", the traversal goes left to way 4. Since way 4 has been selected, address J replaces address E in way 4 of the cache. The current tree state that was used to select way 4 can be encoded as "100" since this represents the values of traversed nodes 200, 202, and 205, respectively. The prior art PLRU replacement method requires that all of the nodes in the path to the selected way (i.e. way 4) are changed to point away from the way that was just selected (i.e. way 4). Referring to FIG. 6, this method results in node 200 having its state changed to a "0", and nodes 202 and 205 having their respective states changed to a "1".

Referring to FIG. 6, when an access to address K (a miss) is received, traversal of the binary tree starts at node 200. Because node 200 has a value "0", the traversal goes left to node 201. Because node 201 has a value "1", the traversal goes right to node 204. Because node 204 has a value "0", the traversal goes left to way 2. Since way 2 has been selected, address K replaces address C in way 2 of the cache. The current tree state that was used to select way 2 can be encoded as "010" since this represents the values of traversed nodes 200, 201, and 204, respectively. The prior art PLRU replacement method requires that all of the nodes in the path to the selected way (i.e. way 2) are changed to point away from the way that was just selected (i.e. way 2). Referring to FIG. 7, this method results in node 201 having its state changed to a "0", and nodes 200 and 204 having their respective states changed to a "1".

Referring to FIG. 7, when an access to address J is received, a cache hits occurs because the address J is already stored in the cache. Traversal of the binary tree is thus not needed because no allocation is required. However, the prior art PLRU replacement method requires that all of the nodes in the path to the selected way (i.e. way 4) are changed to point away from the way that was just selected (i.e. way 4). Referring to FIG. 8, this method results in node 200 having its state changed to a "0". Note that FIG. 8 illustrates the traversal path that would be used for allocation purposes on the next cache miss. That is, in FIG. 8, the current tree state can be encoded as "001" which results in the selection of way 1 for the next allocation.

Figure 9:
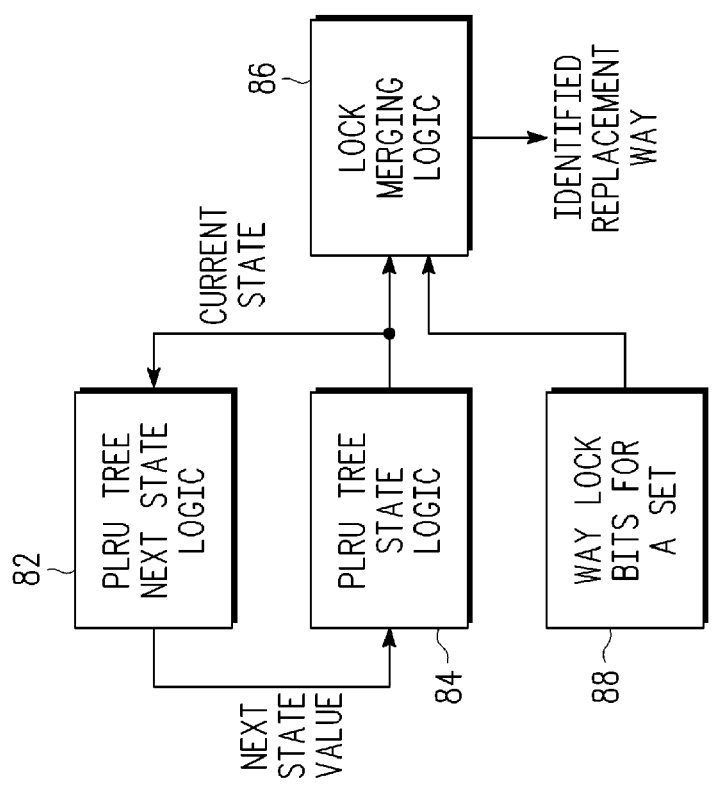
FIG. 9 illustrates, in block diagram form, circuitry for generating an identified replacement way, in accordance with the prior art.

FIG. 9 illustrates, in block diagram form, circuitry 80 for generating an identified replacement way, in accordance with the prior art. Circuitry 80 includes PLRU tree state logic 84 which stores the PLRU tree state (which may operate similar to PLRU tree state logic 38 of FIG. 2). PLRU tree state logic 84 provides the current tree state to both PLRU tree next state logic 82 and lock merging logic 86. PLRU tree next state logic receives the current tree state, and, using the table of FIG. 3, determines how to update the current state and provides the updated current state as the next state value back to PLRU tree state logic. Also, though, the current tree state is provided to lock merging logic 86 which receives way lock bits for a set 88 and determines an identified replacement way. The way lock bits for a set 88 may operate similar to lock circuitry 70 which provides selected lock bits 33. Since PLRU tree next state logic 82 does not take into consideration any lock information when updating the tree states (i.e. when generating the next state values), the current state, which indicates a selected way for replacement, that is provided to lock merging logic 86 may actually indicate a locked way. Therefore, it is necessary that lock merging logic 86 determine whether the selected way indicated by the current state is locked or not by postprocessing the information provided by the current state from PLRU tree state logic 84 using way lock bits for a set 88. Furthermore, if lock merging logic 86 determines that the selected way indicated by the current state is locked, it must then use an algorithm to determine which way is to be identified instead, where this way is then output as the identified replacement way. For example, the algorithm typically used is to sequentially cycle through the ways until a first available way is found; however, as will be described in reference to an example below, this may result in making a very poor choice for a replacement way since it defeats the purpose of the PLRU tree. Therefore, only after this post-processing is done, does lock merging logic 86 provide an identified replacement way which is available for replacement (i.e. unlocked).

Figure 10:
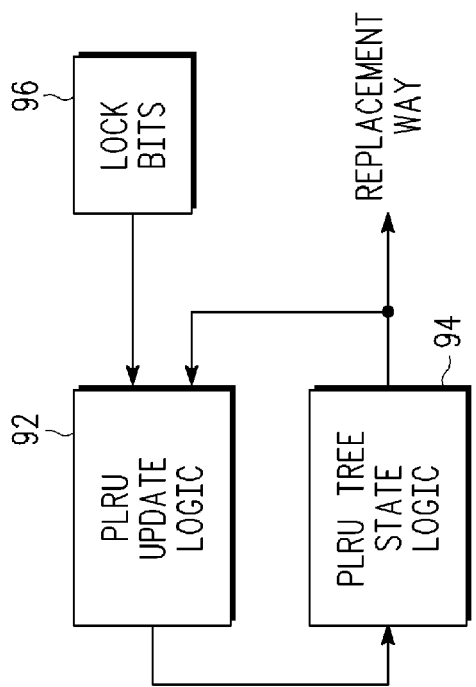
FIG. 10 illustrates, in block diagram form, circuitry for generating a replacement way using integrated lock bit, in accordance with one embodiment of the present invention.

However, FIG. 10 illustrates circuitry 90 for generating a replacement way using integrated lock information, in accordance with one embodiment of the present invention, in which no post-processing of the selected way provided by the PLRU tree state logic is necessary, thus improving speed. Circuitry 90 may correspond, for example, to the circuitry of FIG. 2 which has been simplified for illustration purposes. PLRU tree state logic 94, which operates similar to PLRU tree state logic 38 of FIG. 2 and allocation way selection circuitry 46, provides a replacement way and also provides the current tree state which indicates the replacement way to PLRU update logic 92. PLRU update logic 92 receives lock bits 92 and uses these bits, as will be described with respect to FIGS. 12-20 below, as well as the current tree state from PLRU tree state logic 94, to update the current tree state and thus provide a next tree state value to PLRU tree state logic 94. Therefore, note that PLRU update logic 92 may operate similar to PLRU update logic 34 and lock bits 92 may be similar to lock circuitry 70. Therefore, note that by integrating the lock information into the PLRU tree state updates themselves, the replacement way indicated by a current tree state generated by PLRU tree state logic 94 is known to be an available, i.e. unlocked, way, without the need for further processing the selected replacement way. That is, the replacement way provided by PLRU tree state logic 94 can be directly used as the actual replacement way. This is in contrast to circuitry 80 of FIG. 9, which, after a selected replacement way is provided by PLRU tree state logic 84 based on the current state, lock merging logic 86 is still required to further determine if that way is locked, and if so, it must perform even further processing to determine an actual replacement way.

Figure 11:
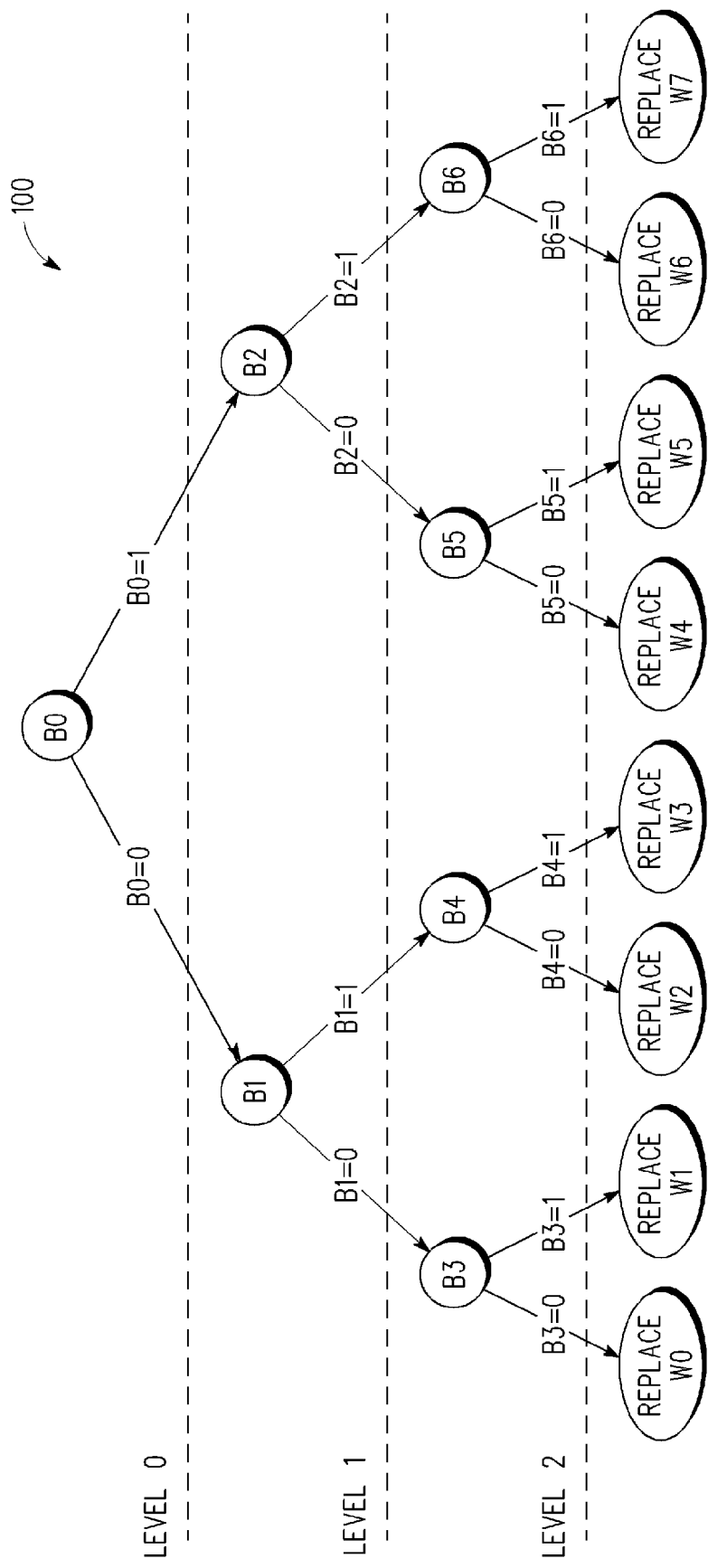
FIG. 11 illustrates, in state diagram form, a PLRU replacement binary tree for an 8-way set associative cache having 7 nodes in accordance with one embodiment of the present invention.

FIG. 11 illustrates a PLRU replacement binary tree 100 for an 8-way set associative catch in accordance with one embodiment of the present invention. PLRU tree 100 includes 7 nodes: B0, B1, B2, B3, B4, B5, and B6, where B0 is the root node and B3-B6 are considered leaf nodes. Also, note that B0 is in level 0 of PLRU tree 100, B1 and B2 are in level 1 of PLRU tree 100, and B3-B6 are in level 2 of PLRU tree 100. In a particular PLRU tree state of PLRU tree 100, each of nodes B0-B6 has a value of "0" or "1", where, as described above in reference to FIG. 4, when PLRU tree 100 is traversed, starting at root node B0, a "0" value of a node means "go left," and a "1" value of a node means "go right." Therefore, as illustrated in FIG. 11, the arrow which points from each parent node to the left child node includes the notation that the parent node equals 0 while the arrow which points from each parent node to the right child node includes the notation that the parent node equals 1. PLRU tree 100 may be traversed when a miss occurs in the cache and it has been determined that allocation is desired. Note that in one embodiment, the PLRU tree 100 is only traversed on allocation (when, for example, allocate signal 52 is asserted). For alternate embodiments, the PLRU tree 100 may be traversed on cache hits, cache misses, or any other desired and appropriate occurrence or combination of occurrences. Of course, the path of traversal of the tree will vary accordingly.

Referring back to FIG. 2, PLRU array 40 includes a current PLRU tree state corresponding to each set of cache circuitry 22. A current PLRU tree state represents the current values of nodes B0-B6, such that, when traversed, indicates what way for the corresponding set is to be selected for allocation. (Therefore, in one embodiment, note that each entry in PLRU array 40 stores the values of each of nodes B0-B6 for the corresponding set.) As was described above in reference to FIGS. 4-9, the current way to be allocated on the next miss for each set can be an encoding of the current tree state, such as with a 3-bit value, where the encoding provides sufficient information to determine which way is being indicated by the current PLRU tree state for a subsequent allocation in each set. In the illustrated embodiment, the current tree state of PLRU 100 is updated when a hit occurs in cache circuitry 22 (as indicated by signals HIT_WAY[0:7] 50). In an alternate embodiment, the current state of PLRU tree 100 may be updated to a new state after PLRU tree 100 is traversed to select a replacement way for allocation (by, for example, allocation way selection circuitry 46). In the illustrated embodiment, lock information is taken into consideration when updating the new state, such that a current state of PLRU tree 100 cannot indicate a locked way. For example, the current state of PLRU tree 100 can be updated according to the rules illustrated in table 102 of FIG. 12.

Referring to FIG. 12, table 102 provides PLRU bit update rules in which lock information is merged into the PLRU tree state updates. For a cache hit, hit signals (such as, e.g. HIT_WAY[0:7] 50 signals) are used to select which row in FIG. 12 (i.e. which way) is to be used. For cache allocation, allocation select signals (such as, e.g., ALLOC_WAY[0:7] 58 signals) are used to select which row in FIG. 12 (i.e. which way) is to be used. In the embodiment which will be described in reference to FIGS. 13-20 below, it will be assumed that a PLRU update using the rules of table 102 of FIG. 12 only occurs in response to a cache hit. However, note that in alternate embodiments, a PLRU update according to table 102 can be performed only in response to a cache allocation or in response to either a cache hit or cache allocation. A "No Update" in a row in FIG. 12 indicates that the corresponding node update enable signal (of node update enables 54) is negated, and thus, the corresponding write value (of write values 56) can be a don't care since no update of the node value will take place. A variable name in a row in FIG. 12 indicates that the corresponding node update enable signal (of node update enables 54) is asserted and an appropriate write value of that node is provided based on the lock information of ways 0-7 of a particular set. Therefore, referring to FIG. 2, index 30 of address 26 indicates a particular set of set 0 through set N–1, indicates a particular PLRU tree state (current PLRU tree state) from PLRU array 40 for the particular set, and indicates a particular set of lock bits from lock array 72 for the particular set.

Figure 13:
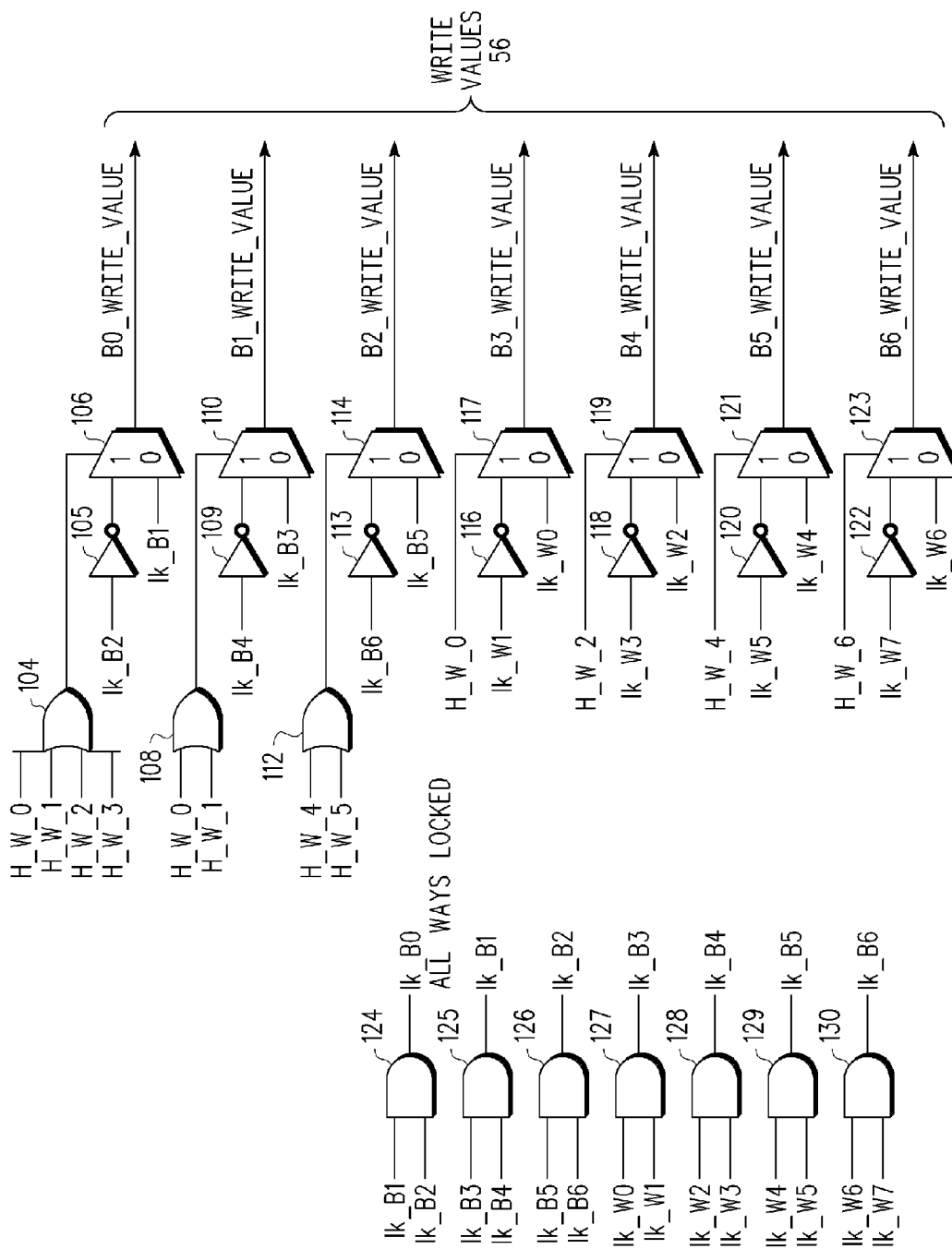

In table 102 of FIG. 12, note that a "~" preceding a variable name indicates the inverse or negative of that value. Also, note that lk_W0, lk_W1, lk_W2, lk_W3, lk_W4, lk_W5, lk_W6, and lk_W7 correspond to the lock bits of each of ways 0-7, respectively, as provided by selected lock bits 33 (corresponding to the entry of lock array 72 selected by index 30). (Note that these lock bits can also be referred to as the lock bits of each of lines 0-7, since they correspond to lock bits of each way within a particular set selected by index 30, thus providing lock information for each cache line within the selected set.) When these lock bits are asserted, the corresponding way for the selected set (i.e. the corresponding cache line) is locked, and when unasserted, the corresponding way for the selected set (i.e. the corresponding cache line) is unlocked and available for replacement. The values of lk_B0, lk_B1, lk_B2, lk_B3, lk_B4, lk_B5, and lk_B6 are then determined (as illustrated in FIG. 13) using the lock bits of ways 0-7, where these values correspond to the lock values which are propagated to each of the nodes of PLRU tree 100. For example, if lk_Bx is asserted, both child nodes of Bx are also locked. Note that if lk_B0 is asserted (i.e., if its value is "1"), then all ways of the cache are locked, and all_locked indicator 55 is asserted.

If all_locked indicator 55 is asserted, a default way may be selected for replacement. That is, in one embodiment, allocation way selection circuitry 46 may include default logic which points to a predetermined one of the plurality of ways in the cache. In an alternate embodiment, when all_locked indicator 55 is asserted, no way is selected for replacement, and thus, a cache replacement does not occur. In yet another embodiment, all_lock indicator 55 may be provided to PLRU update logic 34 which then selects a default way or indicates to other cache control circuitry 36 that no way is selected.

FIG. 13 illustrates circuitry which generates the write values of each of nodes B0-B6 for PLRU tree 100 when implementing the rules of FIG. 12, and FIG. 14 illustrates circuitry which generates the node update enables for each of nodes B0-B6 for PLRU tree 100 when implementing the rules of FIG. 12. For example, the circuitry of FIGS. 13 and 14 may be a portion of PLRU update logic 34 of FIG. 2. The write values may be provided as write values 56 in FIG. 2, and include B0_write_value, B1_write_value, B2_write_value, B3_write_value, B4_write_value, B5_write_value, and B6_write_value. (Note that in FIG. 13, assertion of the signal H_W_x indicates a hit in way x, and may be provided via HIT_WAY[0:7] signals 50.) The node update enables values may be provided as node update enables 54 of FIG. 2, and includes update_B1, update_B2, update_B3, update_B4, update_B5, and update_B6. Note that there is no update_B0 generated because, according to table 102 of FIG. 12, node B0 is always updated, regardless of which way is currently being accessed. Therefore, the circuitry of FIGS. 13 and 14 implement the PLRU update rules of table 102 of FIG. 12.

FIG. 13 includes an AND gate 127 which receives lk_W0 as a first input and lk_W1 as a second input and provides the value lk_B3, an AND gate 128 which receives lk_W2 as a first input and lk_W3 as a second input and provides the value lk_B4, an AND gate 129 which receives lk_W4 as a first input and lk_W5 as a second input and provides the value lk_B5, and an AND gate 130 which receives lk_W6 as a first input and lk_W7 as a second input and provides the value lk_B6.

FIG. 13 also includes an AND gate 126 which receives lk_B5 as a first input (from AND gate 129) and lk_B6 as a second input (from AND gate 130) and provides the value lk_B2, an AND gate 125 which receives lk_B3 as a first input (from AND gate 127) and lk_B4 as a second input (from AND gate 128) and provides the value lk_B1, and an AND gate 124 which receives lk_B1 as a first input (from AND gate 125) and lk_B2 as a second input (from AND gate 126) and provides the value lk_B0.

FIG. 13 also includes an OR gate 104 which receives each of H_W_0, H_W_1, H_W_2, and H_W_3 as inputs and provides an output to a control input of multiplexer 106. The value lk_B2 (from AND gate 126) is provided as an input to an inverter 105 whose output (i.e. ~lk_B2) is provided as a first data input to multiplexer 106. The value lk_B1 (from AND gate 125) is provided as a second data input to multiplexer 106, and multiplexer 106 outputs B0_write_value. FIG. 13 also includes an OR gate 108 which receives each of H_W_0 and H_W_1 as inputs and provides an output to a control input of multiplexer 110. The value lk_B4 (from AND gate 128) is provided as an input to an inverter 109 whose output (i.e. ~lk_B4) is provided as a first data input to multiplexer 110. The value lk_B3 (from AND gate 127) is provided as a second data input to multiplexer 110, and multiplexer 110 outputs B1_write_value. FIG. 13 also includes an OR gate 112 which receives each of H_W_4 and H_W_5 as inputs and provides an output to a control input of multiplexer 114. The value lk_B6 (from AND gate 130) is provided as an input to an inverter 113 whose output (i.e. ~lk_B6) is provided as a first data input to multiplexer 114. The value lk_B5 (from AND gate 129) is provided as a second data input to multiplexer 114, and multiplexer 114 outputs B2_write_value. FIG. 13 also includes a multiplexer 117 which receives H_W_0 at its control input. The value lk_W1 (from selected lock bits 33) is provided as an input to an inverter 116 whose output (i.e. ~lk_W1) is provided as a first data input to multiplexer 117. The value lk_W0 (from selected lock bits 33) is provided as a second data input to multiplexer 117, and multiplexer 117 outputs B3_write_value. FIG. 13 also includes a multiplexer 119 which receives H_W_2 at its control input. The value lk_W3 (from selected lock bits 33) is provided as an input to an inverter 118 whose output (i.e. ~lk_W3) is provided as a first data input to multiplexer 119. The value lk_W2 (from selected lock bits 33) is provided as a second data input to multiplexer 119, and multiplexer 119 outputs B4_write_value. FIG. 13 also includes a multiplexer 121 which receives H_W_4 at its control input. The value lk_W5 (from selected lock bits 33) is provided as an input to an inverter 120 whose output (i.e. ~lk_W5) is provided as a first data input to multiplexer 121. The value lk_W4 (from selected lock bits 33) is provided as a second data input to multiplexer 121, and multiplexer 121 outputs B5_write_value. FIG. 13 also includes a multiplexer 123 which receives H_W_6 at its control input. The value lk_W7 (from selected lock bits 33) is provided as an input to an inverter 122 whose output (i.e. ~lk_W7) is provided as a first data input to multiplexer 123. The value lk_W6 (from selected lock bits 33) is provided as a second data input to multiplexer 123, and multiplexer 123 outputs B6_write_value.

FIG. 14 includes an OR gate 140 which receives each of H_W_0, H_W_1, H_W_2, and H_W_3 as inputs and provides update_B1 as its output, an OR gate 142 which receives each of H_W_4, H_W_5, H_W_6, and H_W_7 as inputs and provides update_B2 as its output, an OR gate 144 which receives each of H_W_0 and H_W_1 as inputs and provides update_B3 as its output, an OR gate 146 which receives each of H_W_2 an dH_W_3 as inputs and provides update_B4 as its output, an OR gate 148 which receives each of H_W_4 and H_W_5 as inputs and provides update_B5 as its output, and an OR gate 150 which receives each of H_W_6 and H_W_7 as inputs and provides update_B6 as its output.

In operation, FIGS. 13 and 14 provide one embodiment for implementing the rules of table 102 of FIG. 12. Alternate embodiments may use other circuitry to implement the logic of table 102. Node Bx is updated with the state value of Bx_write_value when update_Bx is asserted (where, in the current embodiment, update_Bx is "1" when asserted). When update_Bx is negated, node Bx is not updated, and the value of Bx_write_value effectively becomes a don't care. As can be seen from table 102, note that B0 is always updated, therefore, regardless of which way hits, B0 is updated with the state value of B0_write_value. Node B1 is updated with the state value of B1_write_value only when a hit occurs in way 0, 1, 2, or 3. Node B2 is updated with the state value of B2_write_value only when a hit occurs in way 4, 5, 6, or 7. Node B3 is updated with the state value of B3_write_value only when a hit occurs in way 0 or 1. Node B4 is updated with the state value of B4_write_value only when a hit occurs in way 2 or 3. Node B5 is updated with the state value of B5_write_value only when a hit occurs in way 4 or 5. Node B6 is updated with the state value of B6_write_value only when a hit occurs in way 6 or 7.

Referring to FIG. 13, node B3 is written with the inverse value of lk_W1 (i.e. ~lk_W1) when a hit occurs in way 0, and it is written with the value of lk_W0 when a hit occurs in way 1. Note that when a hit occurs in either of way 0 or way 1, update_B3 is enabled. In this manner, if W1 is unlocked and a hit occurs in way 0, node B3 is set to point away from the most recently used way, W0. That is, node B3 is set to "1" such that it points to W1. However, if W1 is locked, then when a hit occurs in way 0, node B3 is set such that it continues to point to W0 (i.e., it is set to "0"), even though it is the most recently used way, because it cannot point to a locked way (i.e. it cannot point to a locked line). That is, node B3 is "frozen" to point away from the locked way (i.e. the locked line). If there is a hit in way 1, then the value of node B3 is set to the lk_W0. Therefore, if W0 is unlocked, then B3 is set to "0" such that it points away from W1; however, if W0 is locked, then B3 is set to "1" such that it continues to point to W1, even though it is the most recently used way, because it cannot point to locked W1. Note that if a hit occurs in any of ways 2-7, the value of node B3 remains unchanged because update_B3 will not be asserted. Node B4 is updated in a similar manner, where node B4 is only updated when there is a hit in way 2 or 3. If there is a hit in way 2, then B4 is set to the inverse of lk_W3; however, if there is a hit in way 3, then B4 is set to lk_W2. In this manner, the value of B4 is set to point away from the way that is currently accessed, unless it cannot because the other way is locked. Also, if a hit occurs in any of ways 0, 1, 4, 5, 6, or 7, then B4 remains unchanged because update_B4 will not be asserted.

Nodes B3 and B4 are children nodes of node B1. Therefore, node B1 is updated with the state value of B1_write_value when there is a hit in way 0, 1, 2, or 3. If a hit occurs in way 0 or way 1, then node B1 is updated with the value of the inverse of lk_B4 (i.e. ~lk_B4). If a hit occurs in way 2 or way 3, then B1 is updated with the value lk_B3. Note that the value of ~lk_b4 is based on the lock values of ways 2 and 3 (lk_W2 and lk_W3, as can be seen through the inputs of AND gate 128) and the value of lk_B3 is based on the lock values of ways 0 and 1 (lk_W0 and lk_W1, as can be seen through inputs of AND gate 127). In this manner, note that when both B3 and B4 are locked, B1 is also locked (as can be seen by the inputs to AND gate 125).

Updates of nodes B5, B6, and B2 operate in a manner similar to that described in reference to nodes B3, B4, and B1, respectively. Node B0, which is the parent of nodes B1 and B2, is written with the inverse value of lk_B2 (i.e. ~lk_B2) when a hit occurs in any of ways 0 through 3, else, it is written with the value of lk_B1. The value of lk_B2 is based on the lock values of ways 4-7 (lk_W4 through lk_W7, as can be seen through the inputs of AND gates 129, 130, and 126, which generate lk_B2) and the value of lk_B1 is based on the lock values of ways 0-3 (lk_W0 through lk_W3, as can be seen through the inputs of AND gates 127, 128, and 125, which generate lk_B1). Therefore, note that the lock information of B1 and B2 is propagated up into the update of B0, where each of B1 and B2 were also updated using lock information propagated up from their children nodes, nodes B3 and B4 and nodes B5 and B6, respectively.

Note that in the embodiment described in reference to FIGS. 13 and 14, the PLRU tree state is updated in response to cache hits. In alternate embodiments, the PLRU tree state may also be updated after cache allocations. In this embodiment, circuitry similar to that of FIGS. 13 and 14 can also be used within PLRU update logic 34 where A_W_x signals may be used in place of the H_W_x signals, where assertion of the A_W_x signal indicates way x is selected for allocation and can be provided by ALLOC_WAY[0:7] 58.

FIGS. 15-20 illustrate embodiments of a new PLRU replacement method for one set of an 8-way set associative cache using a binary tree having 7 nodes labeled B0 -B6, where lock information is integrated into the PLRU updates. Note that FIG. 15 assumes that ways 0-7 of the cache are storing addresses A-H, respectively, and that the value of nodes B1, B2, and B5 is "0," while the value of nodes B0, B2, B4, and B6 is "1". In the illustrated embodiment, an asterisk (*) to the right of the way number indicates that that way is a locked way (i.e. that the selected line in the way is a locked line), as indicated by selected lock bits 33 from lock array 72, and an asterisk to the right of a node value indicates that the lk_Bx value of that node is "1" to indicate that both of its child nodes are locked. Therefore, in the embodiment of FIG. 15, ways 2, 3, and 6 are locked. Also, note that node B4 is indicated as locked as well because both ways 2 and 3 are locked. That is, the value of lk_B4 is "1" since lk_W2 and lk_W3 are both "1" as well (see, e.g., AND gate 128 of FIG. 13). Therefore, note that, as will be discussed further below, node B1 cannot be set to "1" because it cannot point to a locked node.

Figure 16:
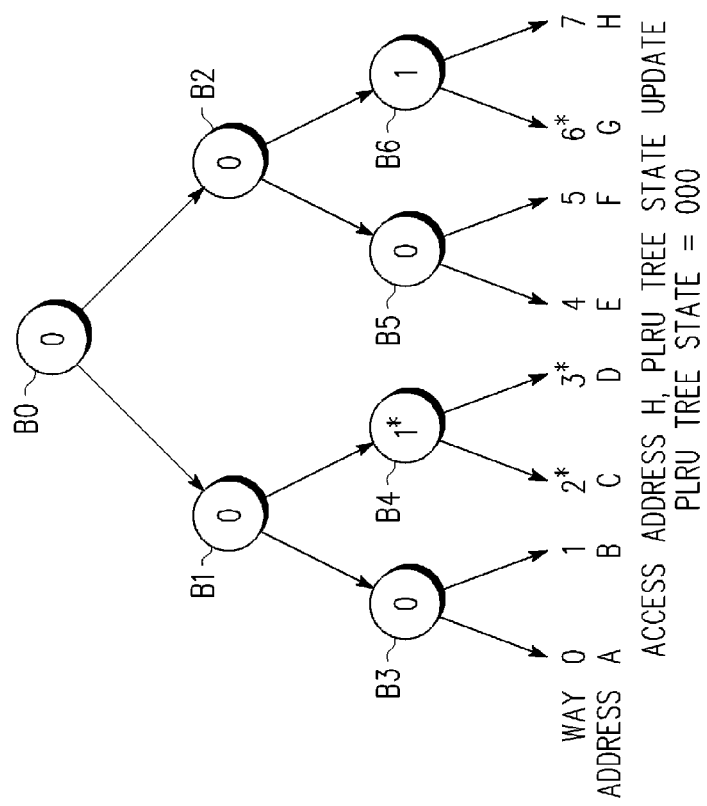

In the illustrated embodiment, the thick arrows indicate the next victim on allocation. (Note that for the illustrated embodiment, the binary tree is only traversed on allocation. For alternate embodiments, the binary tree may be traversed on cache hits, cache misses, or any other desired and appropriate occurrence or combination of occurrences. Of course the path of traversal of the tree will vary accordingly.) Therefore, the current PLRU tree state can be represented as "111", where this value indicates that the binary tree would be traversed starting from node B0 to the right to node B2 (due to the first "1" in current tree state "111"), then to the right to node B6 (due to the second "1" in current tree state "111"), and then to the right to indicate way 7 (due to the third "1" in current tree state "111"). That is, this traversal matches the thick arrows. Referring to FIG. 15, when an access to address H is received, a hit occurs in way 7. Since a hit has occurred in way 7, the current tree state is updated according to the rules of table 102 of FIG. 12. FIG. 16 illustrates the updated tree state. Since way 7 is the most recently accessed way, node B6 would typically be set to point away from way 7 by setting it to "0." However, in the current embodiment, way 6 is locked, therefore, node B6 cannot point to way 6. Therefore, the value of node B6 is not changed and remains set to "1", just as it was in FIG. 15 prior to the access to way 7. Each subsequent node up the tree is also set to point away from the most recently accessed way (way 7), if possible, based on the lock information. Therefore, node B2 is set to point away from way 7 by setting it to "0" (which is possible because node B5 is not locked) and node B0 is set to point away from way 7 by setting it to "0" (which is also possible, because B1 is not locked). Therefore, the new current PLRU tree state can be represented as "000" which indicates way 0 as the next victim way for allocation (where, during a next allocation, a line or entry of way 0, based on index 30, would be replaced with updated cache data). Note also that the updated state, "000," does not indicate a locked way or line.

Figure 17:
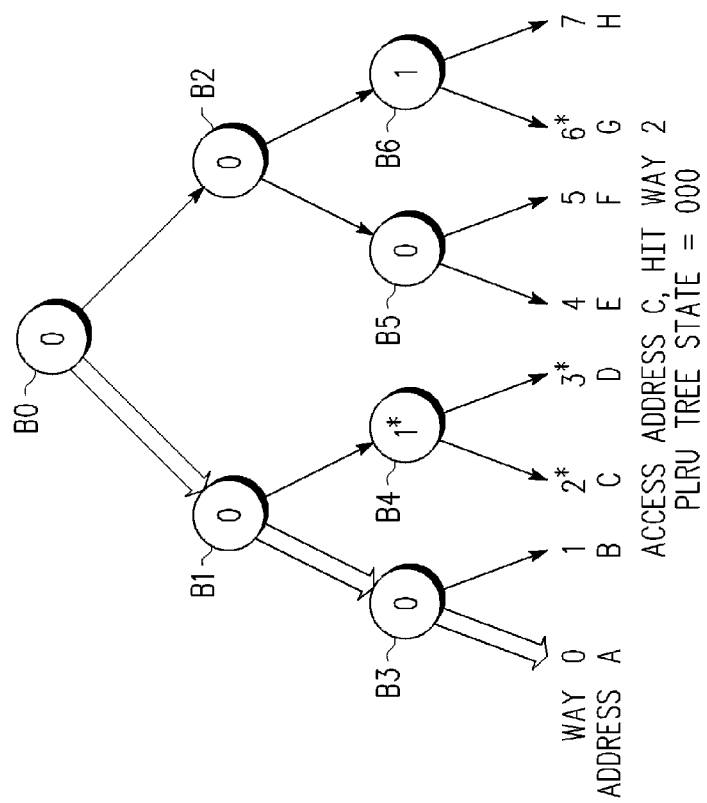

Referring to FIG. 17, the current PLRU tree state is "000" (as was updated in FIG. 16) and as indicated by the thick arrow. In FIG. 17, an access to address C is received which results in a hit to way 2. Therefore, way 2 becomes the most recently accessed way. Since a hit has occurred, the current tree state is updated according to the rules of table 102 of FIG. 12. FIG. 18 illustrates the updated tree state, where, upon an access to way 2, nodes B0, B1, and B4 are updated, according to table 102. Since way 2 is the most recently accessed way, node B4 is updated by setting it to "0" (i.e. as indicated in table 102, when there is an access to way 2, B4 is updated to the value of the inverse of lk_W3, and lk_W3 in this case is "1," as indicated by the asterisk.) Note that since way 3 is locked, node B4 is not pointing away from way 2, as would normally have been the case in the prior art method. Node B1 is updated to the value of lk_B3 (which is "0," as indicated by the lack of an asterisk) such that it points away from way 2. Node B0 is updated to point away from way 2, and thus is updated to "1", as shown in FIG. 18. (Note that according to table 103, upon an access to way 2, node B0 is set to the inverse of lk_B2, which is "0" in the illustrated embodiment.) Therefore, the updated tree state, as illustrated in FIG. 18, is "100" where way 4 is indicated as the next victim for allocation (where, during a next allocation, a line or entry of way 4, based on index 30, would be replaced with updated cache data). In the illustrated embodiment of FIGS. 17 and 18, note that node B4 was updated according to table 102 even though it is considered locked (i.e. even though lk_B4 is asserted). However, in alternate embodiments, when a node is locked (i.e. lk_Bx is asserted), its state value is not updated, even though table 102 indicates it is to be updated. That is, in this alternate embodiment, table 102 provides the update rules for only those nodes which are unlocked (i.e. where lk_Bx is negated).

Figure 20:
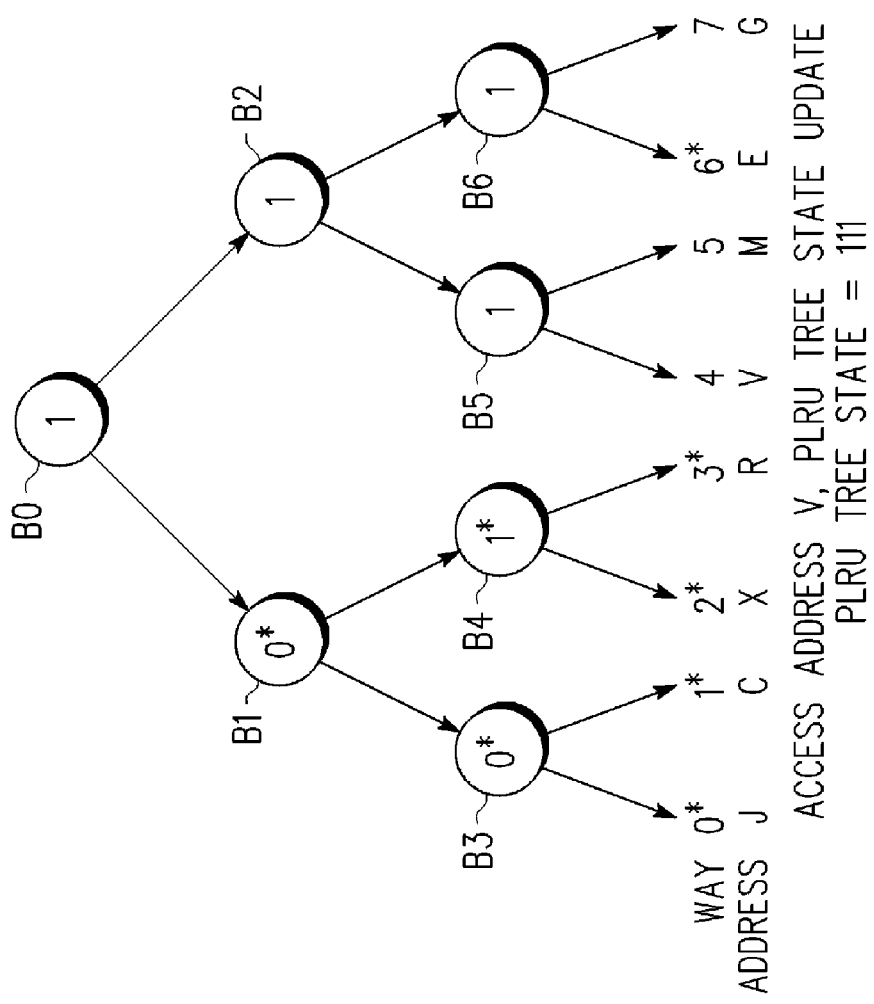

In the embodiments of FIGS. 19 and 20, it is assumed that subsequent accesses have occurred, and currently, for the set selected, address J is stored in way 0, address C is now stored in way 1, address X is now stored in way 2, address R is now stored in way 3, address V is now stored in way 4, address M is now stored in way 5, address E is now stored in way 6, address G is now stored in way 7, and the lock bits have been updated to indicate that ways 0, 1, 2, 3, and 6 are locked. In this manner, note that the lock information is propagated up the tree, such that node B3 is indicated as locked (lk_B3 is "1") because both ways 0 and 1 are locked, node B4 is indicated as locked (lk_B4 is "1") because both ways 2 and 3 are locked, and node B1 is also indicated as locked (lk_B1 is "1") because both of its child nodes are locked. Therefore, the values of nodes B3, B4, and B1 all have asterisks. In the embodiment of FIG. 19, note that the current PLRU tree state is "100" as indicated by the thick arrows. An access address V is received, which hits in way 4. Therefore, way 4 becomes the most recently accessed way. Since a hit has occurred, the current tree state is updated according to the rules of table 102 of FIG. 12. FIG. 20 illustrates the updated tree state, where, upon an access to way 4, node B0, B2, and B5 are updated, according to table 102. Since way 4 is the most recently accessed way, node B5 is set to point away from way 4 by setting it to "1" (i.e. as indicated in table 102, when there is an access to way 4, B5 is updated to the value of the inverse of lk_W5, and lk_W5 in this case is "0," as indicated by the lack of an asterisk.) Node B2 is updated to the inverse value of lk_B6 (which is "0," as indicated by the lack of an asterisk) such that it also points away from way 4. Typically, node B0 would be updated from "1" to "0" such that it also points away from way 4. However, in the illustrated embodiment, node B0 cannot point to node B1 because node B1 is locked (i.e. lk_B1 is "1" because both its child nodes, B3 and B4 are locked). Therefore, in the current embodiment, node B0 remains "1." That is, according to table 102, upon an access to way 4, node B0 is updated to the value of lk_B1, which is "1," as indicated by the asterisk. Therefore, the updated tree state, as illustrated in FIG. 20, is "111" where way 7 is indicated as the next victim for allocation (where, during a next allocation, a line or entry of way 7, based on index 30, would be replaced with updated cache data).

Note that in the illustrated embodiment of FIG. 20, if B0 were to have been updated to point away from way 7, regardless of the lock information, as was done in the prior art method described above, the updated tree state would have instead been "000." This tree state would instead indicate way 0, rather than way 7, as the next victim for allocation, where way 0 is locked. That is, the prior art method allows for a tree state to indicate a locked way. Therefore, upon post-processing this selection using the lock bits, as was described in reference to FIG. 9, it would be determined that way 0 is an unavailable selection for allocation because it is locked. The post-processing would use an algorithm to instead identify an actual replacement way to be used. In many prior art systems, this algorithm would continue to sequentially cycle through the ways until an available way were found. For example, in the current example, since way 0 would have been determined as unavailable, the post-processing would attempt to select way 1, which would also be determined to be unavailable, and then way 2, which would also be determined to be unavailable, and then way 3, which would also be determined to be unavailable, before finally attempting way 4. Way 4 would be the first way encountered that is available, and thus would be been chosen by the prior art post-processing as the next victim for allocation, whereas, in the illustrated embodiment of FIG. 20, the updated tree state "111" indicates way 7 as the next victim for allocation. Note that way 4, which would be the next way used for allocation according to the prior art, is actually the poorest choice of ways for allocation because way 4 was actually the most recently used way (due to access address V). Therefore, since the prior art method does not take into consideration lock information, not only is post-processing required to determine availability of a selected way with the possible need to then select another way, but the resulting choice can be detrimental to system performance by actually resulting in a choice that would overwrite useful information in the cache.

In the embodiments of FIGS. 15-20, note that the asterisk associated with a particular way was indicated by the stored values in lock array 72, and that the asterisks associated with particular nodes were indicated by the combinational logic implemented in FIG. 13. That is, the intermediate values of lk_Bx used to generate the write values in FIG. 13 are not stored in a particular array as are the lock bits, but are generated each time write values are generated. However, in an alternate embodiment, the lock information for each node can be saved alongside the corresponding PLRU tree state in PLRU array 40, or may actually be stored alongside the state value of each node within a PLRU tree state. For example, in one embodiment, each PLRU tree state may store a state value for each node Bx of a PLRU tree and along with each state value, each PLRU tree state may also store a lock value for each node as well.

By now it should be appreciated that there has been provided a new cache replacement methodology which integrates lock information which may allow a cache to more efficiently handle way selections for allocation. Furthermore, note that, in one embodiment, the update method described above, which integrates the lock information, prevents the PLRU tree states stored in PLRU array 40 from indicating a locked way or line. In this manner, once a current PLRU tree state is traversed to select a victim way for allocation, it is known, without further post-processing, that the selected victim way is not locked and thus available for allocation.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Although the invention described herein references data caches, alternate embodiments may use an instruction cache, a memory address translation cache, a branch prediction cache, or any other type of cache or combination of caches. The term cache is intended to include any type of cache.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Additional Text

1. A cache comprising:
   storage circuitry for storing information in each of a plurality of cache lines;
   addressing circuitry having an input for receiving memory addresses and comparing received memory addresses with multiple ways of stored addresses to determine a hit condition representing a match of a stored address and a received address;
   a pseudo least recently used (PLRU) tree circuit for storing one or more states of a PLRU tree, the PLRU tree having a plurality of levels beginning with a root and which indicates one of a plurality of ways in the cache, each level having one or more nodes, multiple nodes within a same level being child nodes to a parent node of an immediately higher level; and
   PLRU update circuitry coupled to the addressing circuitry and the PLRU tree circuit, the PLRU update circuitry receiving lock information to lock one or more lines of the cache and preventing a PLRU tree state from selecting a locked line.

2. The cache of statement 1 wherein the PLRU update circuitry further comprises logic circuitry that locks any parent node when all child nodes of a corresponding parent node are locked in response to the lock information.

3. The cache of statement 2 wherein the PLRU update circuitry locks a root node corresponding to the root of the PLRU tree, thereby locking all of the plurality of ways in the cache.

4. The cache of statement 3 wherein the PLRU update circuitry further comprises default logic which points to a predetermined one of the plurality of ways in the cache when the root node of the PLRU tree is locked by the lock information.

5. The cache of statement 3 wherein the PLRU update circuitry does not select a replacement way to be replaced next when the root node of the PLRU tree is locked by the lock information.

6. The cache of statement 1 wherein the PLRU tree circuit stores a node lock bit and a node state bit corresponding to each node of the PLRU tree.

7. The cache of statement 1 wherein the PLRU update circuitry implements a traversal of the PLRU tree structure via a traversal path from the root to a lowest level to identify a replacement way that is not locked by the lock information by using lock information associated with each node in the traversal path.

8. A cache comprising:
   multi-way cache circuitry for storing a plurality of sets, each of the plurality of sets comprising a plurality of ways and each way comprising tag, status and data fields;
   hit detection circuitry coupled to the multi-way cache circuitry for providing a hit signal indicating when the multi-way cache circuitry contains information associated with an address received at an input;
   a pseudo least recently used (PLRU) tree circuit for storing one or more states of a PLRU tree, the PLRU tree circuit implementing a tree structure having a plurality of levels beginning with a root and which indicates one of a plurality of ways to be replaced next in the semiconductor cache, each level having one or more nodes, multiple nodes within a same level being child nodes to a parent node of an immediately higher level; and
   PLRU update circuitry coupled to the hit detection circuitry and the PLRU tree circuit, the PLRU update circuitry receiving lock information to lock one or more ways of a cache set and preventing a PLRU tree state from selecting a locked way.

9. The cache of statement 8 wherein the PLRU update circuitry determines whether to prevent each of the one or more states of the PLRU tree from selecting a locked way by traversing the tree structure from the root to a lowest level and using a lock bit associated with each node in the traversal path to perform the determining.

10. The cache of statement 9 wherein the PLRU tree circuit stores the lock bit associated with each node in the traversal path and a corresponding node state bit for indicating a path direction to a next level node in the traversal path.

11. The cache of statement 9 wherein the PLRU update circuitry further comprises logic circuitry that locks any parent node when all child nodes of a corresponding parent node are locked in response to the lock information.

12. The cache of statement 11 wherein the PLRU update circuitry locks the root of the tree structure, thereby locking all of the plurality of ways to be replaced next in the semiconductor cache.

13. The cache of statement 12 wherein the PLRU update circuitry further comprises default logic which points to a predetermined one of the plurality of ways to be replaced next in the semiconductor cache when the root of the tree structure is locked by the lock information.

14. The cache of statement 12 wherein the PLRU update circuitry does not select a replacement way when the root of the tree structure is locked by the lock information.

15. A method comprising:
providing storage circuitry in a cache for storing information in each of a plurality of cache lines;
providing addressing circuitry having an input for receiving memory addresses and comparing received memory addresses with multiple ways of stored addresses to determine a hit condition representing a match of a stored address and a received address; and
providing a pseudo least recently used (PLRU) tree circuit for storing one or more states of a PLRU tree, the PLRU tree circuit implementing a tree structure having a plurality of levels beginning with a root and which indicate one of a plurality of ways to be replaced next in the cache, each level having one or more nodes, multiple nodes within a same level being child nodes to a parent node of an immediately higher level; and
coupling PLRU update circuitry to the addressing circuitry and the PLRU tree circuit, the PLRU update circuitry receiving lock information to lock one or more ways of the PLRU tree and preventing a PLRU tree state from selecting a locked line.

16. The method of statement 15 further comprising:
providing logic circuitry in the PLRU update circuitry that locks any parent node when all child nodes of a corresponding parent node are locked in response to the lock information.

17. The method of statement 16 further comprising:
locking a root node corresponding to the root of the PLRU tree, thereby locking all of the plurality of ways to be replaced next in the cache.

18. The method of statement 17 further comprising:
either not selecting a replacement way when the root node of the PLRU tree is locked by the lock information or using a default value that points to a predetermined one of the plurality of ways to be replaced next in the cache when the root node of the PLRU tree is locked by the lock information.

19. The method of statement 15 further comprising:
storing a node lock bit and a node state bit for each node of the PLRU tree.

20. The method of statement 15 further comprising:
traversing the PLRU tree structure via a traversal path from the root to a lowest level to identify a replacement way that is not locked by the lock information by using lock information associated with each node in the traversal path.

What is claimed is:

1. A cache comprising:
storage circuitry for storing information in each of a plurality of cache lines;
addressing circuitry having an input for receiving memory addresses and comparing received memory addresses with multiple ways of stored addresses to determine a hit condition representing a match of a stored address and a received address;
a pseudo least recently used (PLRU) tree circuit for storing one or more states of a PLRU tree, the PLRU tree having a plurality of levels beginning with a root and which indicates one of a plurality of ways in the cache, each level having one or more nodes, multiple nodes within a same level being child nodes to a parent node of an immediately higher level, wherein, when there is at least one unlocked way of the cache, none of the one or more states of the PLRU tree indicate a locked way; and
PLRU update circuitry coupled to the addressing circuitry and the PLRU tree circuit, the PLRU update circuitry receiving lock information to lock one or more lines of the cache and preventing a PLRU tree state from selecting a locked line, wherein the lock information comprises a way lock bit for each cache line of the cache which indicates whether a corresponding way of the cache is locked or not and a node lock bit corresponding to each node of the PLRU tree which indicates whether a corresponding node of the PLRU tree is locked or not;
wherein, for each allocation of a new cache line when there is at least one unlocked way of the cache, a state of the PLRU tree stored by the PLRU tree circuit indicates a selected replacement way, wherein the selected replacement way indicated by the state of the PLRU tree is directly used as the selected replacement way for the new cache line without further processing of the selected replacement way.

2. The cache of claim 1 wherein the PLRU update circuitry further comprises logic circuitry that locks any parent node when all child nodes of a corresponding parent node are locked in response to the lock information.

3. The cache of claim 2 wherein the PLRU update circuitry locks a root node corresponding to the root of the PLRU tree, thereby locking all of the plurality of ways in the cache.

4. The cache of claim 3 wherein the PLRU update circuitry further comprises default logic which points to a predetermined one of the plurality of ways in the cache when the root node of the PLRU tree is locked by the lock information.

5. The cache of claim 3 wherein the PLRU update circuitry does not select a replacement way to be replaced next when the root node of the PLRU tree is locked by the lock information.

6. The cache of claim 1 wherein the PLRU update circuitry implements a traversal of the PLRU tree structure via a traversal path from the root to a lowest level to identify a replacement way that is not locked by the lock information by using the node lock bit associated with each node in the traversal path.

7. The cache of claim 1, wherein the PLRU update circuit updates at least one state of the one or more states of the PLRU tree in response to the hit condition determined by the addressing circuitry.

8. A cache comprising:
multi-way cache circuitry for storing a plurality of sets, each of the plurality of sets comprising a plurality of ways and each way comprising tag, status and data fields;
hit detection circuitry coupled to the multi-way cache circuitry for providing a hit signal indicating when the multi-way cache circuitry contains information associated with an address received at an input;
a pseudo least recently used (PLRU) tree circuit for storing one or more states of a PLRU tree, the PLRU tree circuit implementing a tree structure having a plurality of levels beginning with a root and which indicates one of a plurality of ways to be replaced next in the semiconductor cache, each level having one or more nodes, multiple nodes within a same level being child nodes to a parent node of an immediately higher level, wherein, when there is at least one unlocked way of the cache, none of the one or more states of the PLRU tree indicate a locked way; and PLRU update circuitry coupled to the hit detection circuitry and the PLRU tree circuit, the PLRU update circuitry receiving lock information to lock one or more ways of a cache set and preventing a PLRU tree state from selecting a locked way, wherein the lock information comprises a way lock bit for each cache line of the cache which indicates whether a corresponding way of the cache is locked or not and a node lock bit corresponding to each node of the PLRU tree which indicates whether a corresponding node of the PLRU tree is locked or not;

wherein, for each allocation of a new cache line when there is at least one unlocked way of the cache, a state of the PLRU tree stored by the PLRU tree circuit indicates a selected replacement way, wherein the selected replacement way indicated by the state of the PLRU tree is directly used as the selected replacement way for the new cache line without further processing of the selected replacement way.

9. The cache of claim 8 wherein the PLRU update circuitry determines whether to prevent each of the one or more states of the PLRU tree from selecting a locked way by traversing the tree structure from the root to a lowest level and using the node lock bit associated with each node in the traversal path to perform the determining.

10. The cache of claim 9 wherein the PLRU tree circuit stores the node lock bit associated with each node in the traversal path and a corresponding node state bit for indicating a path direction to a next level node in the traversal path.

11. The cache of claim 9 wherein the PLRU update circuitry further comprises default logic which points to a predetermined one of the plurality of ways to be replaced next in the semiconductor cache when all of the plurality of ways are indicated as locked by the lock information.

12. The cache of claim 9 wherein the PLRU update circuitry does not select a replacement way when the root of the tree structure is locked by the lock information.

13. A method comprising:

providing storage circuitry in a cache for storing information in each of a plurality of cache lines;

providing addressing circuitry having an input for receiving memory addresses and comparing received memory addresses with multiple ways of stored addresses to determine a hit condition representing a match of a stored address and a received address; and providing a pseudo least recently used (PLRU) tree circuit for storing one or more states of a PLRU tree, the PLRU tree circuit implementing a tree structure having a plurality of levels beginning with a root and which indicate one of a plurality of ways to be replaced next in the cache, each level having one or more nodes, multiple nodes within a same level being child nodes to a parent node of an immediately higher level, wherein, when there is at least one unlocked way of the cache, none of the one or more states of the PLRU tree indicate a locked way; and coupling PLRU update circuitry to the addressing circuitry and the PLRU tree circuit, the PLRU update circuitry receiving lock information to lock one or more ways of the PLRU tree and preventing a PLRU tree state from selecting a locked line, wherein the lock information comprises a way lock bit for each cache line of the cache which indicates whether a corresponding way of the cache is locked or not and a node lock bit corresponding to each node of the PLRU tree which indicates whether a corresponding node of the PLRU tree is locked or not, and wherein, for each allocation of a new cache line when there is at least one unlocked way of the cache, a state of the PLRU tree stored by the PLRU tree circuit indicates a selected replacement way, wherein the selected replacement way indicated by the state of the PLRU tree is directly used as the selected replacement way for the new cache line without further processing of the selected replacement way.

14. The method of claim 13 further comprising:

providing logic circuitry in the PLRU update circuitry that locks any parent node when all child nodes of a corresponding parent node are locked in response to the lock information.

15. The method of claim 14 further comprising:

locking a root node corresponding to the root of the PLRU tree, thereby locking all of the plurality of ways to be replaced next in the cache.

16. The method of claim 15 further comprising:

either not selecting a replacement way when the root node of the PLRU tree is locked by the lock information or using a default value that points to a predetermined one of the plurality of ways to be replaced next in the cache when the root node of the PLRU tree is locked by the lock information.

17. The method of claim 13 further comprising:

storing a node lock bit and a node state bit for each node of the PLRU tree.

18. The method of claim 13 further comprising:

traversing the PLRU tree structure via a traversal path from the root to a lowest level to identify a replacement way that is not locked by the lock information by using lock information associated with each node in the traversal path.

* * * * *